US012598691B2

(12) United States Patent
Ashikaga et al.

(10) Patent No.: US 12,598,691 B2
(45) Date of Patent: Apr. 7, 2026

(54) BEAM TRANSPORT SYSTEM AND METHOD, ACCELERATOR INCLUDING BEAM TRANSPORT SYSTEM, AND ION SOURCE INCLUDING THE ACCELERATOR

(71) Applicant: Hitachi High-Tech Corporation, Tokyo (JP)

(72) Inventors: Sakiko Ashikaga, Tokyo (JP); Takamichi Aoki, Tokyo (JP); Kazuya Nagashima, Tokyo (JP); Takayoshi Seki, Tokyo (JP); Koichi Miyazaki, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 148 days.

(21) Appl. No.: 18/367,595

(22) Filed: Sep. 13, 2023

(65) Prior Publication Data

US 2024/0196511 A1 Jun. 13, 2024

(30) Foreign Application Priority Data

Dec. 12, 2022 (JP) ................................ 2022-198189

(51) Int. Cl.
*H05H 7/00* (2006.01)
*H05H 7/04* (2006.01)
*H05H 9/04* (2006.01)

(52) U.S. Cl.
CPC .............. *H05H 7/001* (2013.01); *H05H 7/04* (2013.01); *H05H 9/045* (2013.01)

(58) Field of Classification Search
None
See application file for complete search history.

(56) References Cited

U.S. PATENT DOCUMENTS 12,083,357 B2 * 9/2024 Honda ................. A61N 5/1048
12,121,754 B2 * 10/2024 Takizawa ............. A61N 5/1049
12,201,855 B2 * 1/2025 Fujii .................... A61N 5/1071
12,261,011 B2 * 3/2025 Hori ......................... H01J 27/18
12,317,404 B2 * 5/2025 Ebina ................... A61N 5/1077
(Continued)

FOREIGN PATENT DOCUMENTS

JP 7-190963 A 7/1995
JP 2019-126462 A 8/2019
JP 2022-36471 A 3/2022

OTHER PUBLICATIONS

J. Pfister, et al., Collimation of High Intensity Ion Beams, International Particle Accelerator Conf 2011., San Sebastin, Spain , paper WEPC177.
(Continued)

*Primary Examiner* — Srinivas Sathiraju
(74) *Attorney, Agent, or Firm* — MATTINGLY & MALUR, PC

(57) ABSTRACT

A beam transport system for transporting a charged particle beam, includes a magnetic field generation device that is provided in a transport line that transports the charged particle beam and generates a magnetic field parallel to a center orbit of the charged particle beam, and a beam shielding device that is provided in a region through which the charged particle beam in the magnetic field generation device passes, causes a charged particle beam in a predetermined range of the charged particle beam to pass through, and stops other charged particle beams.

9 Claims, 11 Drawing Sheets

(56) References Cited

U.S. PATENT DOCUMENTS

| | | | | |
|---|---|---|---|---|
| 2006/0289781 | A1* | 12/2006 | Tanimoto | H01J 37/3174<br>250/310 |
| 2008/0258074 | A1* | 10/2008 | Tsukihara | H01J 37/3171<br>250/396 R |
| 2009/0242789 | A1* | 10/2009 | Tachikawa | G21K 5/04<br>250/492.3 |
| 2009/0289194 | A1* | 11/2009 | Saito | H05H 7/04<br>250/492.1 |
| 2014/0187844 | A1* | 7/2014 | Saito | H05H 7/10<br>600/1 |
| 2016/0133433 | A1* | 5/2016 | Fujita | H01J 37/18<br>250/492.3 |
| 2017/0368371 | A1* | 12/2017 | Hanada | G21K 1/093 |
| 2023/0207259 | A1* | 6/2023 | Slot | H01J 37/3045<br>250/491.1 |
| 2023/0238213 | A1* | 7/2023 | Hoinkis | H01J 37/026<br>250/311 |
| 2023/0414970 | A1* | 12/2023 | Tsutsui | A61N 5/1081 |
| 2024/0196511 | A1* | 6/2024 | Ashikaga | H05H 7/08 |
| 2024/0366963 | A1* | 11/2024 | Fujii | A61N 5/1049 |
| 2024/0390701 | A1* | 11/2024 | Fujii | A61N 5/1069 |
| 2025/0133647 | A1* | 4/2025 | Hae | H05H 13/005 |

OTHER PUBLICATIONS

Japanese Office Action received in corresponding Japanese Application No. 2022-198189 dated Feb. 3, 2026.

* cited by examiner

FIG. 3

1000

| MATHEMATICAL EXPRESSION NO. | EXPRESSION RELATED TO PRESENT SYSTEM |
|---|---|
| 1 | $\varepsilon_{beam} = \langle X^t \Sigma_{beam}^{-1} X \rangle$ |
| 2 | $\Sigma_{\text{beam}} = \begin{pmatrix} <x^2> & <xx'> & <x\,y> & <xy'> \\ <x'x> & <x'^2> & <x'y> & <x'y'> \\ <y\,x> & <yx'> & <y^2> & <yy'> \\ <y'x> & <y'x'> & <y'x> & <y'^2> \end{pmatrix}$ |
| 3 | $(\varepsilon_1 - \varepsilon_2)^2 + (2Ak)^2 + 4k[<y^2><yx'> - <x^2><xy'> + <xy>(<xx'> - <yy'>)] = \text{Constant}$<br>$A = \sqrt{<x^2><y^2> - <xy>^2}$ ··· (EXPRESSION 3-1)<br>$\varepsilon_1 = \frac{1}{2}\sqrt{-\text{Tr}[(J\,\Sigma)^2] + \sqrt{Tr^2[(J\,\Sigma)^2] - 16Det[\Sigma]}}$ ··· (EXPRESSION 3-2)<br>$\varepsilon_2 = \frac{1}{2}\sqrt{-\text{Tr}[(J\,\Sigma)^2] - \sqrt{Tr^2[(J\,\Sigma)^2] - 16Det[\Sigma]}}$ ··· (EXPRESSION 3-3) |
| 4 | $\varepsilon_{4d}^2 = \varepsilon_1 \varepsilon_2$ |
| 5 | $\Sigma_{\text{col}} = \begin{pmatrix} <x^2>_{col} & <xx'>_{col} & <x\,y>_{col} & <xy'>_{col} \\ <x'x>_{col} & <x'^2>_{col} & <x'y>_{col} & <x'y'>_{col} \\ <y\,x>_{col} & <yx'>_{col} & <y^2>_{col} & <yy'>_{col} \\ <y'x>_{col} & <y'x'>_{col} & <y'x>_{col} & <y'^2>_{col} \end{pmatrix}$ |
| 6 | $<PL> = -\text{k} <\text{r\^{}2}>$ |
| 7 | $k = \frac{B}{2B\rho}$ |
| 8 | $\varepsilon_{col}(<r^2>^2) = -\left(4k^2 + \frac{1}{4}\right) <r^2>^2 + (Constant)$ |
| 9 | $\frac{I_{loss}}{I_{beam}} = \int_{R_{col}}^{\infty} F\left(\frac{r}{r_{col}}\right) dr$ |
| 10 | $\text{W} = I_{loss}[A] \times 30 \times 10^3[V] \quad [J/s]$ |
| 11 | $\Delta T = W/C$ |
| 12 | $\Delta\text{T}/\Delta\text{Tall} = \frac{I_{loss}}{I_{beam}} = \int_{R_{col}}^{\infty} F\left(\frac{r}{r_{col}}\right) dr$ |

BEAM TRANSPORT SYSTEM AND METHOD, ACCELERATOR INCLUDING BEAM TRANSPORT SYSTEM, AND ION SOURCE INCLUDING THE ACCELERATOR

CROSS-REFERENCE TO RELATED APPLICATION

The present application claims priority from Japanese application JP2022-198189, filed on Dec. 12, 2022, the content of which is hereby incorporated by reference into this application.

BACKGROUND OF THE INVENTION

1. Field of the Invention

The present invention relates to a beam transport system and method, an accelerator including the beam transport system, and an ion source including the accelerator.

2. Description of the Related Art

In order to increase a current output of an accelerator, realization of a high-output ion source and low-loss beam acceleration is required. In general, a beam having an emittance equal to or higher than acceptance of the accelerator cannot be accelerated and is lost. When the beam loss in an acceleration process is large, not only a sufficient output as an accelerator cannot be obtained, but also failure of a device due to heat generation or the like occurs. In order to prevent this, it is necessary to stop the beam outside the acceptance by the collimator in advance to prevent the beam from being incident on the accelerator. In a particle selecting method described in J. Pfister, O. Meusel, O. Kester, "COLLIMATION OF HIGH INTENSITY ION BEAMS", in Proc. International Particle Accelerator Conf 2011., San Sebastin, Spain, paper WEPC177, an operation of rotating a phase space distribution of particles by a magnetic field and an operation of stopping beam particles spatially outside by a collimator are alternately repeated with respect to a beam extracted from an ion source. Thus, in J. Pfister, O. Meusel, O. Kester, "COLLIMATION OF HIGH INTENSITY ION BEAMS", in Proc. International Particle Accelerator Conf 2011., San Sebastin, Spain, paper WEPC177, the particles outside the acceptance of the accelerator are prevented from entering the accelerator in the subsequent stage.

SUMMARY OF THE INVENTION

In the technique described in J. Pfister, O. Meusel, O. Kester, "COLLIMATION OF HIGH INTENSITY ION BEAMS", in Proc. International Particle Accelerator Conf 2011., San Sebastin, Spain, paper WEPC177, since it is necessary to arrange a solenoid magnetic field and the collimator at a plurality of locations, not only the number of devices increases, but also the space required for installing the beam transport system increases, and the manufacturing cost increases. Furthermore, in the technique of J. Pfister, O. Meusel, O. Kester, "COLLIMATION OF HIGH INTENSITY ION BEAMS", in Proc. International Particle Accelerator Conf 2011., San Sebastin, Spain, paper WEPC177, the collimator is installed in a space where no solenoid magnetic field exists, and selection is performed in a state where the beam particle does not have an angular momentum in a beam traveling direction. However, under the above conditions, the emittance of the beam strongly depends on parameters other than the magnitude of the spatial displacement. Therefore, stopping charged particles spatially outside with the collimator does not directly lead to selection of charged particles outside the accelerator acceptance. Therefore, in the technique of J. Pfister, O. Meusel, O. Kester, "COLLIMATION OF HIGH INTENSITY ION BEAMS", in Proc. International Particle Accelerator Conf 2011., San Sebastin, Spain, paper WEPC177, since the charged particles capable of being accelerated are also stopped, it is difficult to increase the output of the accelerator.

The present invention has been made in view of the above problems, and an object thereof is to provide a beam transport system and method capable of efficiently transporting a charged particle beam, an accelerator including the beam transport system, and an ion source including the accelerator.

In order to solve the above problem, according to an aspect of the present invention, there is provided a beam transport system for transporting a charged particle beam, the beam transport system including: a magnetic field generation device that is provided in a transport line that transports the charged particle beam and generates a magnetic field parallel to a center orbit of the charged particle beam; and a beam shielding device that is provided in a region through which the charged particle beam in the magnetic field generation device passes, causes a charged particle beam in a predetermined range of the charged particle beam to pass through, and stops other charged particle beams.

According to the present invention, the charged particle beam can be gathered in the center orbit by the magnetic field generated by the magnetic field generation device and pass through the beam shielding device. Since the charged particle beam outside the predetermined range is stopped by the beam shielding device, the beam can be efficiently transported.

BRIEF DESCRIPTION OF THE DRAWINGS

FIG. 3 is an explanatory diagram of a mathematical expression related to the beam transport system;

DESCRIPTION OF THE PREFERRED EMBODIMENTS

Figure 1:
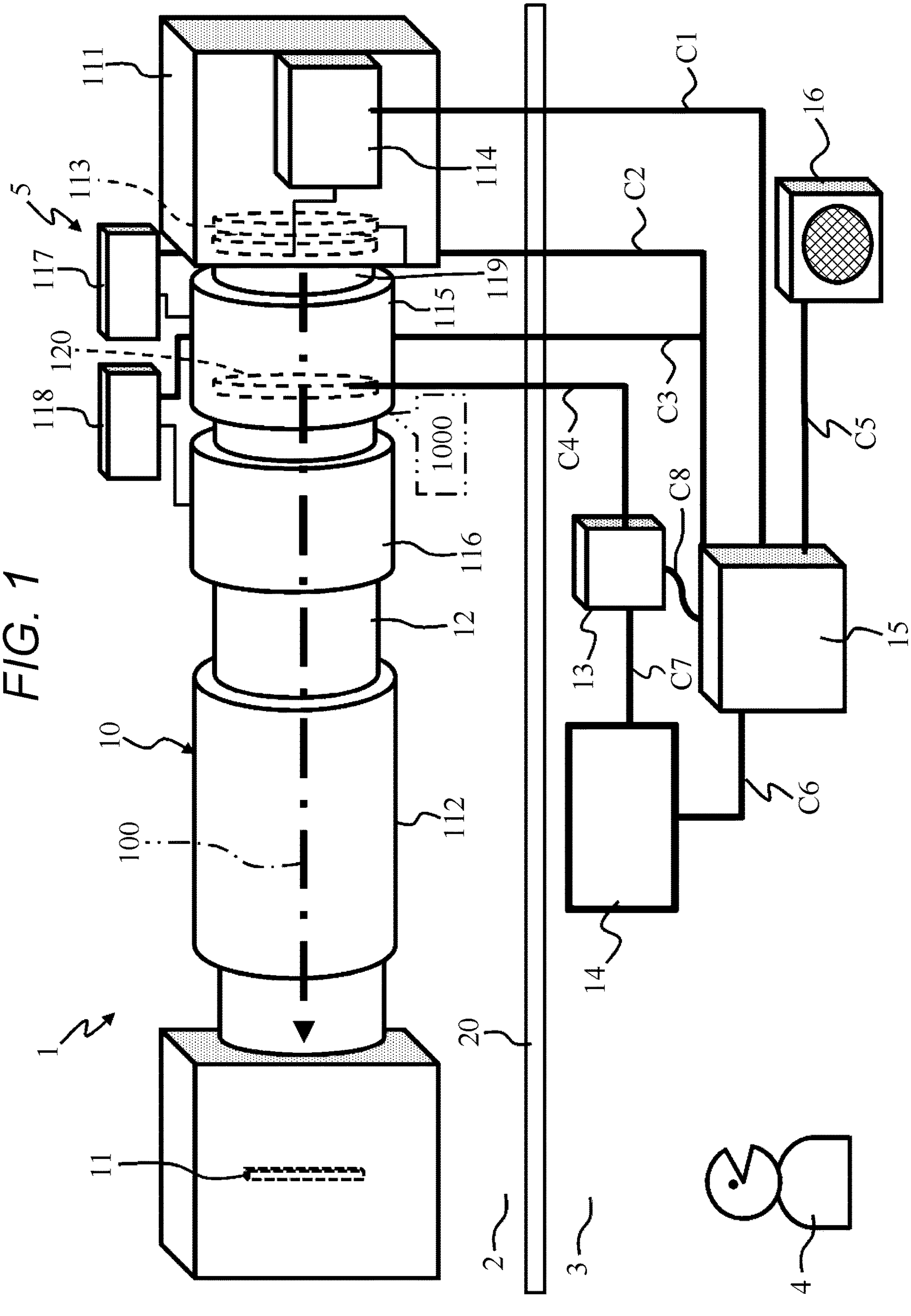
FIG. 1 is a configuration diagram of an accelerator used in a particle therapy system.

Hereinafter, embodiments of the present invention will be described with reference to the drawings. In the present embodiment, as will be described later, charged particles having a large emittance that cannot be accelerated by an accelerator are efficiently stopped, and a loss of a charged particle beam in a collimator is reduced. In the present embodiment, the charged particle beam is set to <xx'>0 and has an angular momentum. As a result, according to the law of conservation of angular momentum of charged particles of the charged particle beam, the emittance of the charged particle beam depends only on the spatial extent of the charged particle beam. Therefore, in the present embodiment, charged particles having different emittance can be selected with high efficiency, and charged particles having a large emittance that cannot be accelerated can be removed. Hereinafter, the charged particle beam may be abbreviated as a beam.

In the beam transport system according to the present embodiment, a convergence force and the angular momentum are given to the charged particle beam by a magnetic field parallel to a traveling direction of the charged particle beam. In this case, it is possible to create a state in which there is almost no correlation <xx'> between a displacement x with respect to a center and an inclination x' in the beam traveling direction, and it is possible to generate a state in which the emittance depends only on a beam radius. Therefore, by installing the collimator in the magnetic field parallel to the beam traveling direction, it is possible to perform particle selection using spatial spread and to select particles having different emittance.

According to the present embodiment, since the emittance of the particles can be selected according to the magnitude of the spatial extent of the beam, charged particles that cannot be accelerated can be stopped without stopping the charged particles that can be accelerated. In the present embodiment, it is possible to minimize the beam loss in the collimator portion and the inside of the accelerator, and it is possible to realize a large current of the accelerator by maximally utilizing the beam that can be accelerated. Furthermore, in the present embodiment, since the beam loss can be reduced, heat generation in the accelerator can be suppressed, and damage to the device due to heat can be prevented.

In the present embodiment, for example, the following configuration is disclosed.

(Expression 1) A beam transport system having a function of selecting a charged particle beam, the beam transport system including: a magnet that generates a magnetic field parallel to a beam orbit on the beam orbit; and a collimator that stops a charged particle according to a displacement of a beam particle from a center orbit, in which by arranging the collimator in the magnetic field, an angular momentum of the charged particle beam is set not to be 0, and a Twiss parameter $\alpha$ is near 0 at least one point on the orbit in the collimator.

(Expression 2) The beam transport system according to Expression 1, in which a temperature change of the collimator portion or cooling water passing through the collimator portion is measured, and feedback is applied to the solenoid magnetic field intensity according to a temperature change amount to create a state in which the Twiss parameter $\alpha$ is near 0 at least one point on the orbit in the collimator.

(Expression 3) The accelerator according to Expression 1 or Expression 2, further including the beam transport system, in which an accelerating beam is selected according to emittance.

(Expression 4) The ion source according to Expression 1 or Expression 2, further including the beam transport system, in which the beam is selected and output according to emittance.

First Embodiment

A first embodiment will be described with reference to FIGS. 1 to 12. FIG. 1 is a configuration diagram of an accelerator 10. The accelerator 10 constitutes a part of a particle therapy system 1. The particle therapy system 1 is disposed, for example, across an accelerator chamber 2, an accelerator operation chamber 3, and a treatment chamber (not illustrated). The particle therapy system 1 irradiates a patient (not illustrated) with a charged particle beam to treat a target volume such as cancer.

The accelerator chamber 2 is a space in which the accelerator 10 is installed. The accelerator chamber 2 is a room whose inside is a radiation management area. In order to prevent leakage of radiation to the outside, the accelerator chamber 2 includes a shielding wall 20 on the outer periphery thereof. A person is restricted from entering the accelerator chamber 2.

In the accelerator chamber 2, the accelerator 10, a lithium target 11, and a beam transport line 12 are arranged as components of the particle therapy system 1. The beam transport line 12 constitutes a beam transport system 5 together with, for example, a solenoid electromagnet 115 and a collimator 120 to be described later. To be precise, a temperature measuring unit (thermocouple 130 and thermometer 13) and a cooling unit (cooling pipe 140) to be described later can also constitute a part of the beam transport system 5.

The accelerator operation chamber 3 is a room for an operator 4 to operate and manipulate the accelerator 10. The accelerator operation chamber 3 is provided in a non-radiation management area located in the vicinity of the accelerator chamber 2. In the accelerator operation chamber 3, the thermometer 13, a display device 14, a control system 15, and a speaker 16 constituting the beam transport line 12 are installed. The operator 4 who performs operation work of the particle therapy system 1 stays in the accelerator operation chamber 3 when treating a patient. The operator 4 grasps the state of the charged particle beam based on visual information from the display device 14 and auditory information from the speaker 16, and performs the operation work of the accelerator 10.

The accelerator 10 accelerates and extracts the charged particle beam. In the present embodiment, the accelerator 10 is a proton accelerator that extracts a proton beam 100 as the charged particle beam. Hereinafter, the charged particle beam 100 may be referred to as a proton beam 100. For example, the accelerator 10 accelerates the proton beam 100 having a current of 25 mA and kinetic energy of 30 keV until the kinetic energy becomes 2.5 MeV, and extracts the beam to the lithium target 11. Each numerical value described below is an example for description, and the beam transport system 5 of the present embodiment is not limited to these numerical values.

The accelerator 10 includes, for example, an ion source 111, the beam transport line 12, and a radio frequency quadrupole linear accelerator 112.

The ion source 111 is an extraction unit that generates and extracts a proton beam. In the example of FIG. 1, the ion source 111 is an electron cyclotron resonance (ECR) type ion source. The ion source 111 includes a plasma chamber (not illustrated) therein, and further includes an extraction electrode 113 and a beam extraction power supply 114.

In the plasma chamber of the ion source 111, hydrogen gas is ionized by a radio frequency voltage to generate hydrogen plasma. The protons in the hydrogen plasma are extracted to the outside of the plasma chamber by the voltage fed to the extraction electrode 113, and are extracted to the low energy beam transport line 12 as the proton beam 100. The proton beam 100 is a collection of protons having momentum. The proton beam 100 extracted from the plasma chamber has a current of 25 mA and a kinetic energy of 30 keV in the present example.

The extraction electrode 113 has two flat plate electrodes arranged to face each other. When a voltage of 30 kV is fed between the flat plate electrodes, protons in the hydrogen plasma generated in the plasma chamber are accelerated to 30 keV and extracted as a proton beam 100.

The beam extraction power supply 114 is a high-voltage power supply, and feeds a high voltage of 30 kV to the extraction electrode 113. The voltage fed by the beam extraction power supply 114 is controlled by the control system 15 via the cable C1. The cable C1 is, for example, a Bayonet Neill Concelman (BNC) cable.

The beam transport line 12 is a transport line whose interior is evacuated and through which the beam passes. The beam transport system 5 is provided in the beam transport line 12. The beam transport system 5 selects and converges the beam in a process of transporting the proton beam 100 extracted from the ion source 111, thereby realizing a beam that can be accelerated by the radio frequency quadrupole linear accelerator 112 and causing the beam to be incident on the radio frequency quadrupole linear accelerator 112.

The radio frequency quadrupole linear accelerator 112 is an accelerator that accelerates a particle beam along a straight line using a radio frequency voltage that is an acceleration voltage supplied from an acceleration radio frequency source 1055. In the present embodiment, the radio frequency quadrupole linear accelerator 112 accelerates the proton beam 100 using a radio frequency voltage until the kinetic energy becomes 2.5 MeV while applying a convergence force, and extracts the proton beam to the lithium target 11.

The lithium target 11 is a conical target mainly made of lithium (Li), and is arranged such that the bottom surface faces the radio frequency quadrupole linear accelerator 112 side. The lithium target 11 has a heat removing function using cooling water. The lithium target 11 generates thermal neutrons by causing a 7Li(p,n)7Be reaction with protons in the proton beam 100 supplied from the accelerator 10, and extracts the thermal neutrons as a thermal neutron beam to a patient in the treatment chamber.

The beam transport line 12 is a beam transport system through which a low energy beam passes, and is a transport line that transports the proton beam 100 extracted from the ion source 111 from the right to the left in FIG. 1 so that the proton beam enters the radio frequency quadrupole linear accelerator 112.

The beam transport line 12 includes solenoid electromagnets 115 and 116, solenoid electromagnet power supplies 117 and 118, a thermometer 13, a display device 14, a recording device 16, a speaker 16, and a beam current measuring device 20. The beam transport line 12 induces a magnetic field parallel to the traveling direction of the proton beam 100 by the solenoid electromagnets 115 and 116. The induced magnetic field imparts a convergence force to the proton beam 100. Furthermore, in the present embodiment, particles having small emittance are selected by a beam selection mechanism to be described later. With the above configuration, the beam transport system 5 of the present embodiment has a function of shaping the proton beam 100 into a shape that can be accelerated by the radio frequency quadrupole linear accelerator 112.

The solenoid electromagnets 115 and 116 have electric wires spirally wound along the traveling direction of the proton beam 100. When current is supplied from the solenoid electromagnet power supplies 117 and 118 to an electric wire of the solenoid electromagnet, a magnetic field parallel to the traveling direction of the proton beam 100 is induced.

The solenoid electromagnet 115 gives a convergence force and an angular momentum having a beam axis direction as a rotation axis to the proton beam 100 by the induced magnetic field. Furthermore, the solenoid electromagnet 115 stops particles having a large emittance by a collimator 120 provided inside the solenoid electromagnet 115. That is, the solenoid electromagnet 115 has a convergence function of converging the proton beam to the central axis and giving an angular momentum, and a selection function of passing only particles having a small emittance and stopping particles having a large emittance. The solenoid electromagnet 115 selects beam particles that can be accelerated in the radio frequency quadrupole linear accelerator 112 by these two functions and transports the beam particles toward the radio frequency quadrupole linear accelerator 112. The solenoid electromagnet 116 as "another solenoid electromagnet" applies a convergence force to the proton beam 100 by the induced magnetic field. As a result, the solenoid electromagnet 116 is formed into a beam shape that can be accelerated by the radio frequency quadrupole linear accelerator 112, and is extracted to the radio frequency quadrupole linear accelerator 112.

The solenoid electromagnet power supplies 117 and 118 are large current output power supplies, and supply a current in a range of 20 A to 100 A to the solenoid electromagnets 115 and 116. The current supplied from the solenoid electromagnet power supplies 117 and 118 is controlled by the control system 15 via cables C2 and C3. The current value supplied from the solenoid electromagnet power supplies 117 and 118 to the solenoid electromagnets 115 and 116 is temporally changed, so that the proton beam 100 is formed into a shape that can be accelerated by the radio frequency quadrupole linear accelerator 112. The cables C2 and C3 are, for example, BNC cables.

Figure 2:
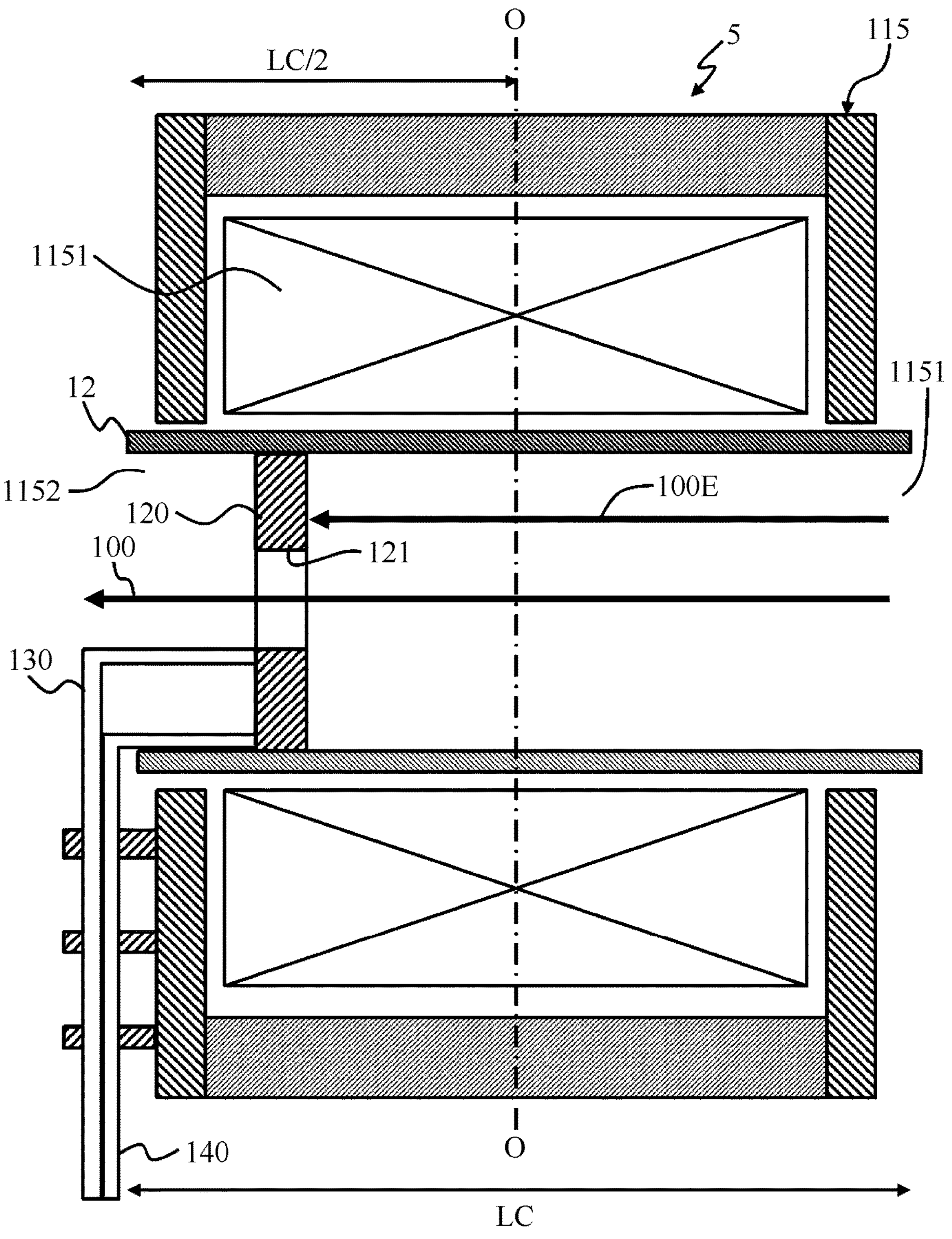
FIG. 2 is a longitudinal sectional view illustrating a structure of an upstream solenoid and a collimator.

FIG. 2 is a cross-sectional view of the solenoid electromagnet 115. The solenoid electromagnet 115 is formed, for example, by winding a coil 1151 outside a cylindrical transport line 12. The proton beam 100 is incident from an inlet 1151 on the right side in FIG. 2 and is extracted from an outlet 1152 on a left side in FIG. 2. The proton beam 100 travels from the right side to the left side in FIG. 2.

The collimator 120 and the thermocouple 130 as a temperature sensor are provided inside the solenoid electromagnet 115. The collimator 120 is, for example, an annular copper metal component, and includes the thermocouple 130 and the cooling pipe 140. The collimator 120 is water-cooled by cooling water (not illustrated) passing through the cooling pipe 140. The solenoid electromagnet 115 induces a magnetic field parallel to the traveling direction of the proton beam 100. As a result, the proton beam 100 receives a convergence force toward the beam center and performs a rotational motion with the traveling direction as the rotation axis. The beam orbit center of the proton beam 100 passes through the center of a circular opening portion 121 of the collimator 120.

When the proton beam 100 passes through the opening portion 121, the collimator 120 blocks the progress of particle 100E having large emittance according to a principle described later. The particles 100E having a large emittance collide with the collimator 120 and increase the temperature of the collimator 120. The temperature of the collimator 120 is measured by the thermocouple 130. The temperature measured by the thermocouple 130 is sent to the thermometer 13 illustrated in FIG. 1 and displayed.

The thermometer 13 detects a current generated by a temperature difference between two probes (not illustrated) of the thermocouple 130 and measures the temperature. The thermocouple 13 sends the measured temperature data to the control system 15 via the cable C8. Further, the thermocouple 13 sends the measured temperature data to the display device 14 via the cable C7. The cables C7 and C8 are, for example, RJ45 cables. Instead of the thermocouple 13, for example, another temperature sensor such as a radiation thermometer may be used. Alternatively, the temperature of the collimator 120 may be indirectly measured by measuring the temperature of the cooling water flowing through the cooling pipe 140.

The collimator 120 can be provided, for example, in a range (LC/2) on the downstream side in the traveling direction of the protons 100 from the axial center (longitudinal center) O-O' of the entire length LC of the solenoid electromagnet 115. That is, the collimator 120 can be provided at a position closer to the outlet 1152 side where the proton beam 100 is extracted from the solenoid electromagnet 115 than the inlet 1151 where the proton beam 100 is incident on the solenoid electromagnet 115. As a result, the solenoid electromagnet 115 can efficiently realize a function of converging the proton beam 100 while rotating the particles of the proton beam 100.

Returning to FIG. 1. The beam current measuring device 20 is a DC current transformer (DCCT) that measures the current of the beam without contacting the beam, and has a function of sequentially measuring the variation in the total amount of the proton beam 100 extracted from the ion source 111. The amount of current measured by the beam current measuring device 20 is sent to the control system 15 using a coaxial cable (not illustrated).

The control system 15 is a computer system including a memory in which a computer program is recorded and a processor (not illustrated) that reads the computer program recorded in the memory and executes the read computer program to implement the above functions.

The control system 15 records the temperature measured by the thermometer 13 and the measurement time. Further, the control system 15 compares the measured temperature with the specified value, and determines that the proton beam 100 is abnormal when a difference between the measured value and the specified value is equal to or larger than a predetermined value. When determining that the proton beam 100 is abnormal (when detecting the abnormality), the control system 15 issues an alert signal. The alert signal is transmitted to the display device 14 by the cable C6 and displayed. Further, the control system 15 sends the alert signal to the speaker 16 by a cable C5 to cause the speaker 16 to sound.

When determining that the proton beam 100 is abnormal, the control system 15 sends a signal for adjusting the magnetic field to the solenoid electromagnet power supplies 117 and 118 via the cables C2 and C3. The cables C2 to C5 are coaxial cables, for example.

In the present embodiment, for example, an actual measurement value of a beam loss amount in the collimator 120 and a ratio of the actual measurement value to all beams are calculated from a temperature rise value measured by the thermometer 13 and a beam current value measured by the beam current measuring device 20 in a procedure described later with reference to FIG. 12.

When the calculated ratio is different from a specified value by 5%, the control system 15 issues an alert signal and transmits an instruction signal for increasing the output current of the solenoid electromagnet power supply 117 by 0.1% as a magnetic field adjustment signal. Meanwhile, when the temperature rise value is 5% lower than the specified value, the control system 15 transmits an instruction signal for decreasing the output current of the solenoid electromagnet power supply 117 by 0.1% as the magnetic field adjustment signal.

The control system 15 may be generated by cooperating a computer having a processor that executes a computer program and a recording device including a recording medium such as a hard disk or a magnetic tape.

The display device 14 is a device that displays various types of information such as characters, figures, and graphics, and is installed in the accelerator operation chamber 3. The display device 14 displays the temperature of the collimator 120 measured by the thermometer 13 and the presence or absence of alert signal by the control system 15 in real time, and notifies the operator 4 of the display.

The speaker 16 is an audio output device that converts an electric signal into audio, and is installed in the accelerator operation chamber 3. When the proton beam 100 is determined to be abnormal, the speaker 16 outputs an alarm sound corresponding to the alert signal received from the control system 15. The speaker 16 functions as a notification unit that notifies the operator 4 of an alarm (abnormality of proton beam 100).

Figure 4:
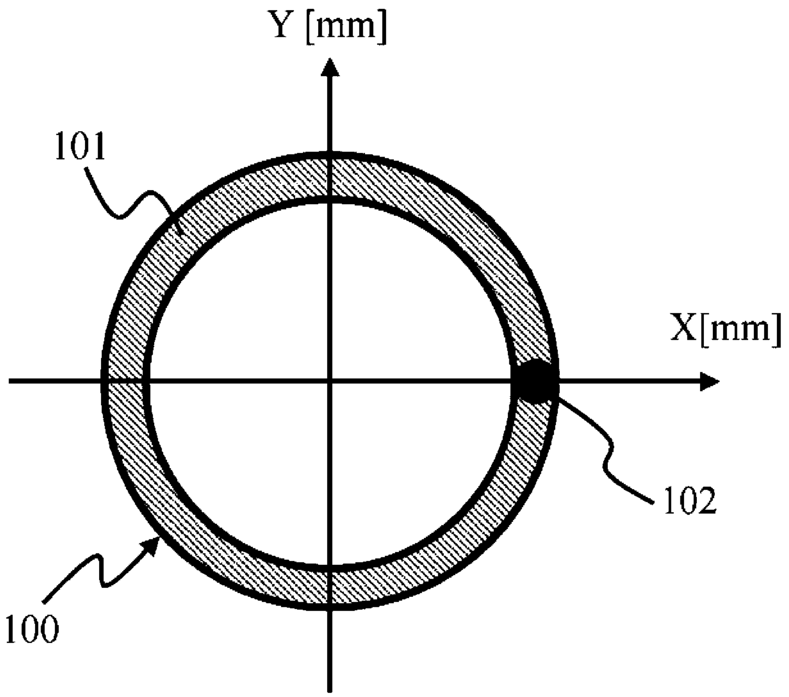
FIG. 4 is an explanatory diagram illustrating an effect of the present embodiment.

FIG. 4 shows an example of a mathematical expression 1000 related to the beam transport system. In general, whether or not a beam particle can be accelerated by an accelerator is determined by a magnitude relationship between acceptance εacceptance of the accelerator and a Courant-Snyder invariant CSbeam of the particle, and only a particle satisfying εacceptance>CSbeam is accelerated, and a particle satisfying εacceptance<CSbeam is lost. An average of the Courant-Snyder invariant CSbeams of the particles in the beam is the four-dimensional emittance Ebeam of the beam.

The abeam is expressed by a dispersion/covariance matrix Σ and a phase space vector X of the beam particle as in Expression 1. The phase space vector X is a four-dimensional vector including positions x and y in two different directions intersecting the beam axis direction and change amounts x' and y' in the beam orbit direction, and X=(x,x', y,y'). The variance/covariance matrix Ebeam is a real symmetric matrix of four rows and four columns, and is a matrix representing a correlation of each element of the phase space vector X, and can be written as Expression 2. The symbol < > in Expressions 1 and 2 represents the operation of taking the average of the particles in the beam. The abeam represents a volume occupied by the beam in a four-dimensional phase space including positions and momenta in two different directions intersecting the beam axis direction. The Ebeam is a conserved quantity and does not change in the process of transporting the beam by the electromagnetic field, and in general, the emittance εion of the beam extracted from the ion source is larger than the acceptance of the accelerator. Therefore, in order to avoid the beam loss in the accelerator, it is necessary to select beam particles having a small emittance and set εbeam<εacceptance at the time of incidence of the accelerator.

Figure 9:
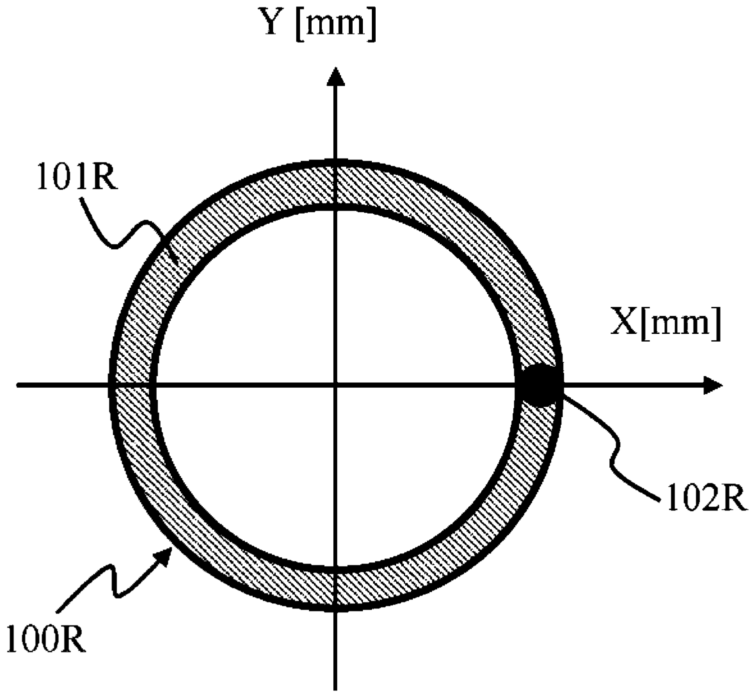
FIG. 9 is an explanatory diagram illustrating a comparative example to be compared with the present embodiment.
Figure 10:
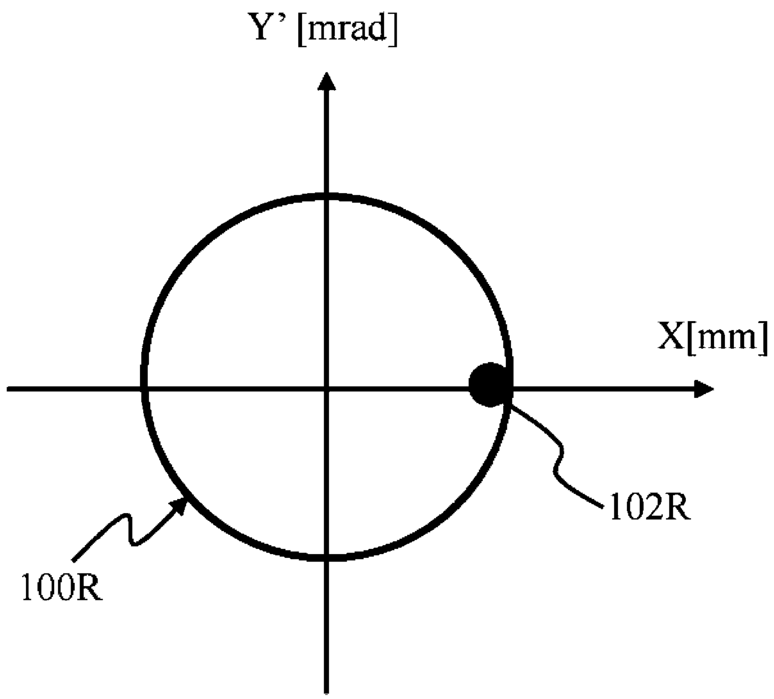
FIG. 10 is an explanatory diagram following FIG. 9.
Figure 11:
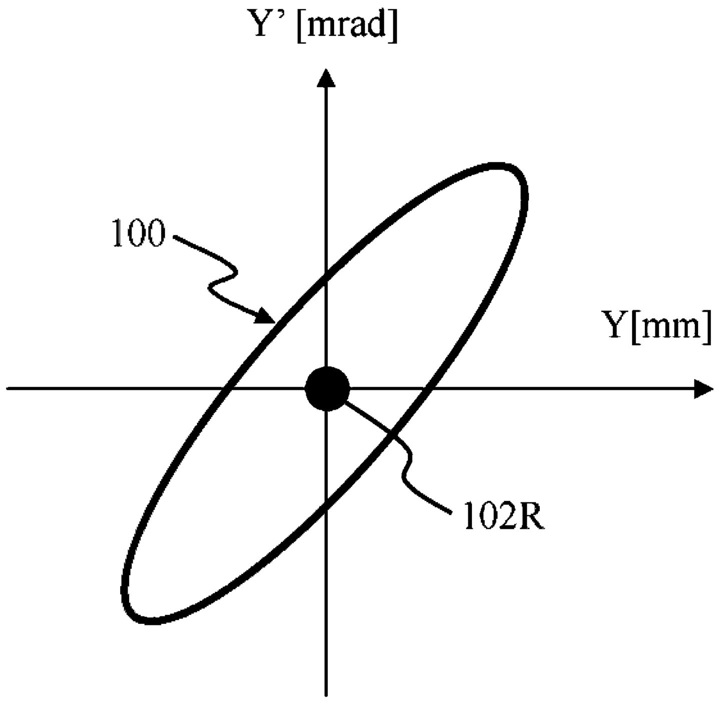
FIG. 11 is an explanatory diagram following FIG. 10.

The effect of beam selection by the beam transport system 5 according to the present embodiment will be described with reference to FIGS. 4 to 11. FIGS. 4 to 8 illustrate the beam selection effect by the beam transport system 5 of the present embodiment, and FIGS. 9 to 11 illustrate comparative examples. FIGS. 9 to 11 illustrate an outline of a phenomenon that occurs in a beam transport system to which the present embodiment is not applied, and are not prior art.

First, a phenomenon at the time of beam selection in the comparative example will be described with reference to FIGS. 9 to 11. In FIGS. 9 to 11, the position of the particle stopped by the collimator in the four-dimensional phase space is illustrated. FIG. 9 shows a portion of beam selection according to a comparative example.

FIG. 9 illustrates a beam distribution on an xy plane of a beam at a collimator passing point. A beam 100R is a distribution of all beams passing through the collimator. A beam 101R is part of the beam 100 R and is a population of particles that are present outside the inner diameter of the collimator in the xy-plane. In the comparative example, the beam 101R is stopped by the collimator. Here, focusing on a beam particle 102R, the position of the beam particle 102R in the four-dimensional phase space is considered. The beam particle 102R is a part of the beam 101R cut by the collimator. The beam particle 102R is a particle having a large displacement in the x direction, and the displacement in the y direction is near 0.

FIG. 10 shows the projection of the four-dimensional phase space distribution of the beam on the x, y' plane. In the comparative example, since the solenoid electromagnet is not provided, the collimator is installed in a space without a magnetic field of the solenoid electromagnet. Therefore, in the comparative example, the beam does not have an angular momentum with the traveling direction as the rotation axis. This means that there is no correlation between x and y', and the distribution of the beam on the x, y' plane has a shape close to a perfect circle. Therefore, y' of the beam particle 102R having the largest displacement in the x direction is near 0.

FIG. 11 shows the projection of the four-dimensional phase space distribution of the beam on the y, y' plane. The beam particle 102R is located at the center of the beam on the y, y' plane because both y and y' are small.

From the above, in the comparative example, when the particles outside the beam on the xy plane are removed by the collimator, the removed particles correspond to the beam center on the y, y' plane. Therefore, in the comparative example, the particles outside the four-dimensional phase space cannot be selectively removed, and the particles inside the four-dimensional phase space are also partially removed at the same time. Furthermore, in the comparative example, since it is difficult to stop the particles outside the phase space at one time only with one collimator, it is necessary to install collimators at a plurality of locations having different phase space distributions of beams to select the particles.

Next, it will be described with reference to FIGS. 4 to 8 that the beam transport system 5 of the present embodiment solves the problem of the comparative example. In the present example, when the proton beam 100 passes through the collimator, an angular momentum is imparted to the proton beam 100, and at the same time, a correlation <xx'> between x and x' of the proton beam 100 is set to be near 0 using a solenoid magnetic field. Accordingly, the present embodiment solves the problem of the comparative example.

FIG. 4 illustrates a beam distribution on the xy plane of a beam at the collimator passing point. The beam 100 is a distribution of all beams passing through the collimator 120. The beam 101 is part of the beam 100 and is a population of particles that reside outside the inner diameter (diameter of the opening portion 121) of the collimator 120 in the xy-plane. The beam 100 is stopped by the collimator 120. Here, focusing on the beam particle 102, the position of the beam particle 102 in the four-dimensional phase space is considered. The beam particle 102 is part of the beam 100 cut by the collimator, is a particle having a large displacement in the x direction, and the displacement in the y direction is near 0.

Figure 5:
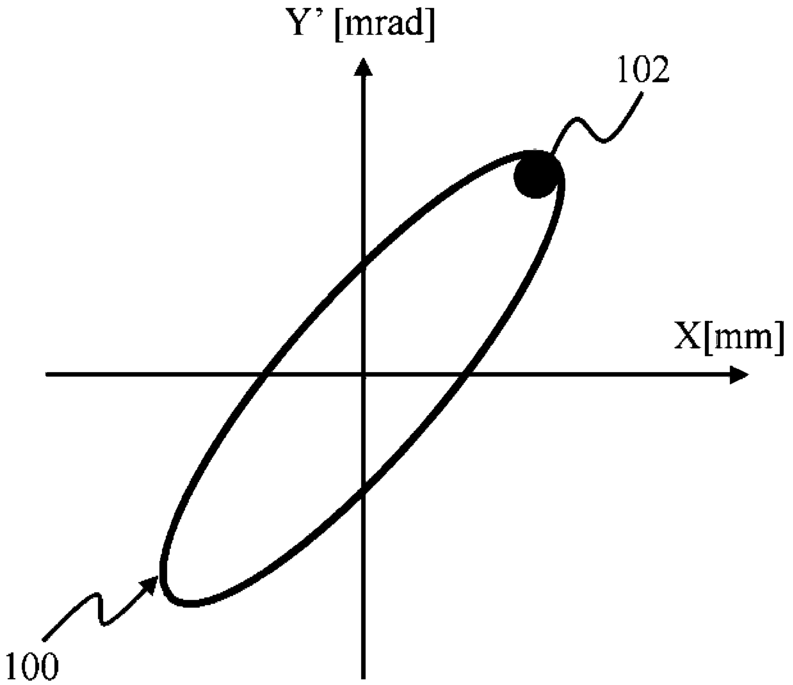
FIG. 5 is an explanatory diagram following FIG. 4.

FIG. 5 shows a projection of the four-dimensional phase space distribution of the proton beam 100 on the x, y' plane. In the present embodiment, since the collimator 120 is installed in the space where the magnetic field parallel to the beam traveling direction exists, that is, the collimator 120 is provided inside the solenoid electromagnet 115, the proton beam 100 has an angular momentum with the traveling direction as the rotation axis. Therefore, there is a correlation between x and y', and the distribution of the proton beam on the x, y' plane has a shape like an inclined ellipse. Therefore, y' of the beam particle 102 having a large displacement in the x direction has a large value.

Figure 6:
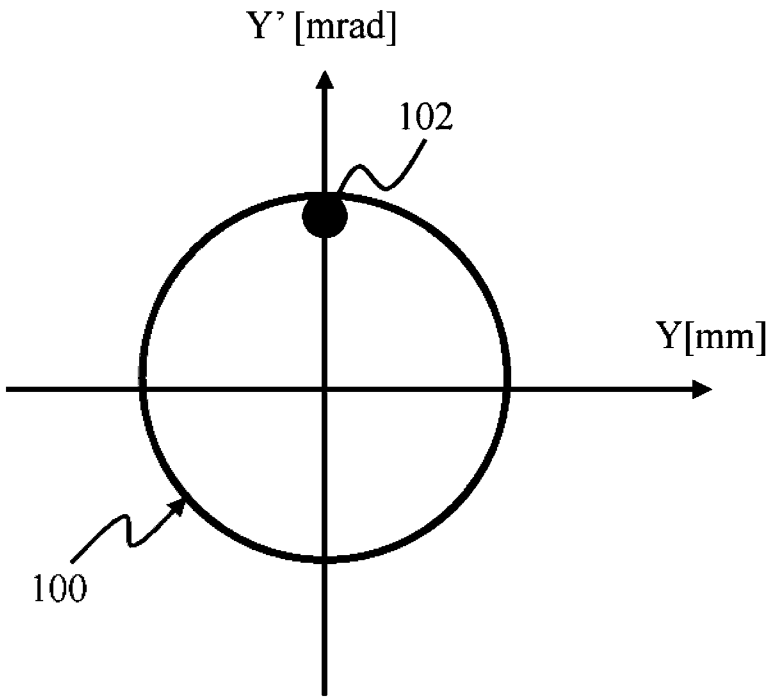
FIG. 6 is an explanatory diagram following FIG. 5.

FIG. 6 shows the projection of the four-dimensional phase space distribution of the beam on the y, y' plane. Since the displacement in the y direction is close to 0 and y' is large, the beam particle 102 is also located at the end of the beam distribution on the y and y' planes.

Figure 7:
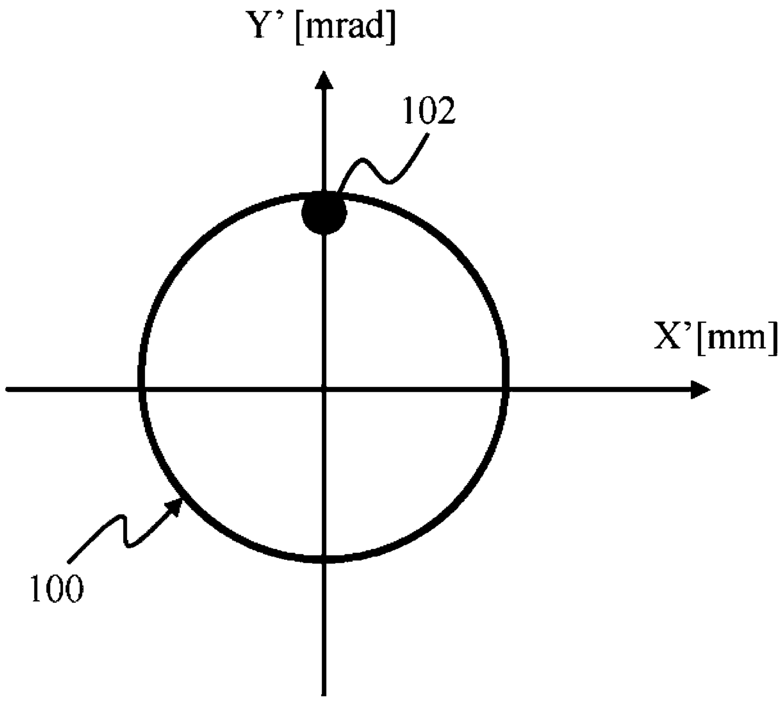
FIG. 7 is an explanatory diagram following FIG. 6.

FIG. 7 shows the projection of the four-dimensional phase space distribution of the beam on the x', y' plane. Since y' of the beam particle 102 is large, x' takes a value near 0.

Figure 8:
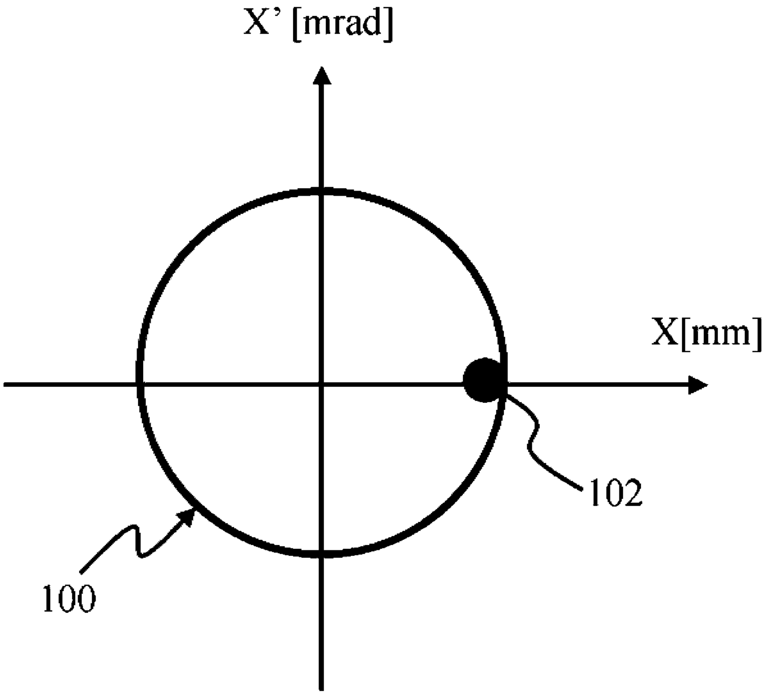
FIG. 8 is an explanatory diagram following FIG. 7.

FIG. 8 shows the projection of the four-dimensional phase space distribution of the beam on the x, x' plane. In the present embodiment, in order to create a state in which there is no correlation between x and x', the shape is close to a perfect circle on the x, x' plane of the beam. Since the displacement of the beam particle 102 in the x direction is large and x' takes a value close to 0, the beam particle 102 is located at the end of the beam distribution even on the x, x' plane.

Therefore, in the present embodiment, when removing particles outside the beam on the xy plane by the collimator 120, particles outside the four-dimensional phase space can be selectively removed. In the present embodiment, only the particles outside the four-dimensional phase space can be selected by arranging the collimator 120 in one place in the solenoid electromagnet 115.

Hereinafter, a mechanism of the beam transport system 5 of the present embodiment will be described using the mathematical expression 1000 illustrated in FIG. 3. In the present embodiment, due to the magnetic field generated by the solenoid electromagnet 115, it is possible to create a state in which the four-dimensional emittance Ecol when the proton beam 100 passes through the collimator 120 depends only on the square <r^2> col of the beam radius. By stopping the particles in the outer portion of the beam in the x and y spaces by the collimator 120, it is possible to reduce the four-dimensional emittance εbeam of the downstream beam. By setting εacceptance>εbeam and selectively removing particles having a large emittance, non-acceleratable particles are prevented from entering the radio frequency quadrupole linear accelerator 112, and a beam loss is reduced.

In general, when Busch's theorem, which is a quantum mechanical angular momentum conservation law, is applied to a beam having a dispersion/covariance matrix Σ, the relationship of Expression 3 is derived. The right side of Expression 3 is an invariant in beam transport by an electromagnetic field. ε1 and ε2 in Expression 3 are intrinsic emittances, and the four-dimensional emittance ε**4*d*** is in the relationship of Expression 4.

The dispersion/covariance matrix Σcol when the proton beam 100 passes through the collimator 120 is expressed by Expression 5. From the cylindrical symmetry of the beam distribution, <x^2>col=<y^2>col=<r ^ 2>col, <x' ^2>col=<y' ^2>col, <yx'>col=−<xy'>col, <xy>col=<x' y'>col=0.

Here, since the collimator 120 is installed in the solenoid electromagnet 115, the proton beam 100 rotates in a plane vertical to the orbit by a magnetic field parallel to the traveling direction. Therefore, there is a relationship of Expression 6 between <yx'>col corresponding to the angular momentum of rotation and the square <r^2>col of the beam orbit radius. k in Expression 6 can be written as Expression 7 by the magnetic flux density B of the solenoid magnetic field and the magnetic rigidity $B_\rho$ of the beam. L in Expression 6 is a distance on the beam orbit from the solenoid electromagnet inlet 1151 to the installation position of the collimator 120. Furthermore, for example, by adjusting the current amount of the solenoid electromagnet 115 through a procedure to be described later, it is possible to realize the excitation amount of the solenoid electromagnet 115 in which <xx'>col and <yy'>col are set to be close to 0. As described above, Ecol can be written as a function Ecol (<r^2>) of <r^2>col as in Expression 8.

Therefore, by adopting, for example, a square root of <r^2> such that 3ε(<r^2>)=εacceptance as the inner diameter Rcol of the collimator 120, when the proton beam 100 is incident on the radio frequency quadrupole linear accelerator 112, it is possible to pass a beam population satisfying εcol<εacceptance. For example, assuming that the distribution of the displacement of the particles in the beam follows a normal distribution, in the present embodiment, about 99.7% of the beam incident on the radio frequency quadrupole linear accelerator 112 can be accelerated.

Next, a principle and a method of setting <xx'>col and <yy'>col to be near 0 by adjusting the excitation amount of the solenoid electromagnet 115 will be described.

Inverted signs of <xx'>col and <yy'>col are Twiss parameters αx and y, which represent convergence and divergence of beams in the x and y directions of beams, respectively. When αx and αy>0, the beam is a convergent beam, and the beam size decreases as the beam progresses. Meanwhile, when αx and αy<0, the beam is a divergent beam, and the beam size increases with the progress of the beam. The proton beam 100 extracted from the ion source 111 passes through a space without a magnetic field until reaching the solenoid electromagnet 115. Therefore, when the proton beam 100 reaches the solenoid electromagnet 115, αx and αy are in a state of <0, and the beam size tends to increase.

The solenoid electromagnet 115 has a function of converging the proton beam 100 in both the x and y directions, and increases the Twiss parameters αx and αy of the proton beam 100. The increase amount of the Twiss parameters αx and αy depends on the product BL of the magnetic field B by the solenoid electromagnet 115 and the distance L from the inlet 1151 of the solenoid electromagnet 115 to the collimator 120. Therefore, αx and ay when the proton beam 100 passes through the collimator 120 can be changed by adjusting the excitation amount of the solenoid electromagnet 115.

An appropriate excitation amount of the solenoid electromagnet 115 can be set by the following mechanism. It can be determined by taking a ratio between the temperature rise amount dT/dt of the collimator 120 measured by the thermometer 13 and a temperature rise value in a case where it is assumed that all the beam current amount Ibeam measured by the beam current measuring device 20 has been lost.

When the proton beam 100 passes through the collimator 120, particles having a displacement in the xy plane equal to or larger than the inner diameter Rcol of the collimator 120 stop. In the case of the present embodiment, in the proton beam 100 that has reached the collimator 120 with the beam size rcol, particles on the outer side in the xy plane cannot pass through the collimator 120 and stop. The ratio between the current amount Iloss of the stopped beam and the beam current value Ibeam measured by the beam current measuring device 20 can be written by Expression 9. Here, F(r/rcol) is a distribution function of displacement of particles in the proton beam 100, and is a distribution function that is generally maximum at r=0. In the present embodiment, for example, a second-order chi-square distribution is used. Therefore, as the ratio between the inner diameter Rcol of the collimator 120 and the beam size rcol when the proton beam 100 reaches the collimator 120 increases, the ratio with respect to the beam current amount Ibeam increases.

The kinetic energy of 30 keV of the particles stopped in the collimator 120 is converted into thermal energy, and the heat quantity W shown in Expression 10 is generated per second. The temperature of the collimator 120 increases by ΔT in proportion to the heat quantity W as shown in Expression 11. Therefore, it can be seen that the larger the ratio between the beam size rcol when the proton beam 100 reaches the collimator 120 and the inner diameter Rcol of the collimator 120, the larger the temperature rise value. C in Expression 11 is the heat capacity of the collimator 120, and is, for example, 40 J/K.

The temperature rise value ΔTall generated when it is assumed that all the beam current amount Ibeam measured by the beam current measuring device 20 is lost can also be calculated in the same manner as in Expressions 10 and 11. As described above, the ratio ΔT/ΔTall of the temperature rise values is expressed by Expression 12.

The relationship between the excitation amount of the solenoid electromagnet 115 and the temperature rise of the collimator 120 described from the above mechanism will be illustrated in the following three cases.

Case 1: When the excitation amount of the solenoid electromagnet 115 is appropriate, it is assumed in the present embodiment that the emittance εion of the beam extracted from the ion source 111 has a magnitude three times as large as the acceptance εacceptance of the radio frequency quadrupole linear accelerator 112 described later. In this case, approximately 22% of the extracted proton beam 100 stops in the collimator 120. At this time, assuming that the beam current amount Ibeam is 35 mA, a heat amount of 231 J is generated, and the temperature rise value ΔTall is 5.1 degrees. Therefore, in the case of the ideal excitation amount, the temperature rise value of the collimator should be 1.2 degrees. The temperature rise value is defined as a specified value Th.

Case 2: When $\alpha x$ and $\alpha y$ when the proton beam 100 passes through the collimator 120 are smaller than 0, it means that the excitation amount of the solenoid electromagnet 115 is insufficient and the proton beam 100 does not obtain a sufficient convergence force. In this case, the beam size when the proton beam 100 passes through the collimator 120 is larger than the ideal beam size. Therefore, the beam amount stopped by the collimator 120 is larger than the beam amount stopped in the ideal case, and the temperature rise value of the collimator 120 is larger than the above-described specified value Th.

Case 3: If $\alpha x$ and $\alpha y$ when the proton beam 100 passes through the collimator 120 are larger than 0, it means that the excitation amount of the solenoid electromagnet 115 is excessive and the proton beam 100 obtains excessive convergence force. In this case, the beam size when the proton beam 100 passes through the collimator 120 is smaller than the ideal beam size. Therefore, the beam amount stopped by the collimator 120 is smaller than the beam amount stopped in the ideal case, and the temperature rise value of the collimator 120 is smaller than the above-described specified value Th.

From the above relationship, by adjusting the excitation amount of the solenoid electromagnet 115 so that the temperature rise value of the collimator 120 approaches the specified value Th, the Twiss parameters $\alpha x$ and $\alpha y$ in the collimator 120 can be set near 0.

An example of a method of operating the beam transport system 5 will be described with reference to FIG. 12. The flowchart of FIG. 12 illustrates a procedure in which the Twiss parameters $\alpha x$ and $\alpha y$ in the collimator 120 are adjusted to the vicinity of 0 in the beam transport line 12 and are always maintained during the operation of the accelerator 10.

Step S10: The operator 4 sets a temperature specified value Th of the collimator 120 in the control system 15. In the present example, it is assumed that about 22% of the extracted beam stops in the collimator 120. At this time, assuming that the beam current amount Ibeam is 35 mA, the temperature rise value of the collimator is 1.2 degrees in the case of the ideal excitation amount. As described above, this temperature rise value is set as the specified value Th of the temperature.

Step S11: The operator 4 turns on the output of the ion source 111. As a result, a voltage of 30 kV is fed to the extraction electrode 113 of the ion source 111, and the proton beam 100 is output.

Step S12: The control system 15 acquires the temperature Tc of the collimator 120 measured by the thermocouple 130 and the thermometer 13. In FIG. 12, the measured temperature of the collimator 120 is represented as a temperature Tc.

Step S13: The control system 15 evaluates a difference between the measured value Tc of the temperature of the collimator 120 measured by the thermometer 13 and the temperature specified value Th. The control system 15 determines whether the difference between the measured value Tc and the specified value Th is less than 5%. When the difference between the measured temperature Tc and the specified value Th is less than 5% (S13: YES), the control system 15 stores the measured temperature Tc in the control system 15 (S14). Meanwhile, when the difference between the measured temperature Tc and the specified value Th is 5% or more (S13: NO), the control system 15 proceeds to Step S15.

Step S15: The control system 15 determines a magnitude relationship between the temperature specified value Th and the measured value Tc. In a case where the measured value Tc is larger than the specified value by, for example, 5% or more, the control system 15 proceeds to Step S16. In a case where the measured value Tc is smaller than the specified value Th by, for example, 5%, the control system 15 proceeds to Step S17.

Step S16: When the measured temperature Tc is larger than the specified value Th by, for example, 5% or more, the magnetic field of the solenoid electromagnet 115 is insufficient, and the particles collide with the collimator 120 more than in the ideal state, and the amount of heat is increased. Therefore, the control system 15 outputs an alert signal and a magnetic field adjustment signal to the display device 14 and the speaker 16. The control system 15 transmits an instruction signal for increasing the output current of the solenoid electromagnet power supply 117 by 0.1% as the magnetic field adjustment signal. As a result, the excitation amount of the solenoid electromagnet 115 is increased. Thereafter, the process proceeds to Step S14, and the control system 15 stores the measured temperature Tc.

Step S17: The magnetic field generated by the solenoid electromagnet 115 is excessive. Therefore, the control system 15 outputs an alert signal to the display device 14 and the speaker 16, and transmits a signal for lowering the output current by the solenoid electromagnet power supply 117 by 0.1% as a magnetic field adjustment signal. As a result, the excitation amount of the solenoid electromagnet 115 decreases. Thereafter, the control system 15 proceeds to Step S14.

The control system 15 stores the measured temperature Tc and the determination result of Step S13 (alternatively, the determination result in Step S13 and the determination result in Step S15), and returns to Step S12.

According to the present embodiment configured as described above, the emittance of the particle can be selected according to the magnitude of the spatial extent of the proton beam 100. Therefore, charged particles that cannot be accelerated can be stopped without stopping the charged particles that can be accelerated.

In the present embodiment, the beam loss in the collimator 120 and the accelerator 112 can be minimized, and it is possible to realize an increase in current of the accelerator 10 by maximally utilizing the beam that can be accelerated. Furthermore, in the present embodiment, since the beam loss can be reduced, heat generation in the accelerator can be suppressed, and damage to the device due to heat can be prevented.

Second Embodiment

Figure 13:
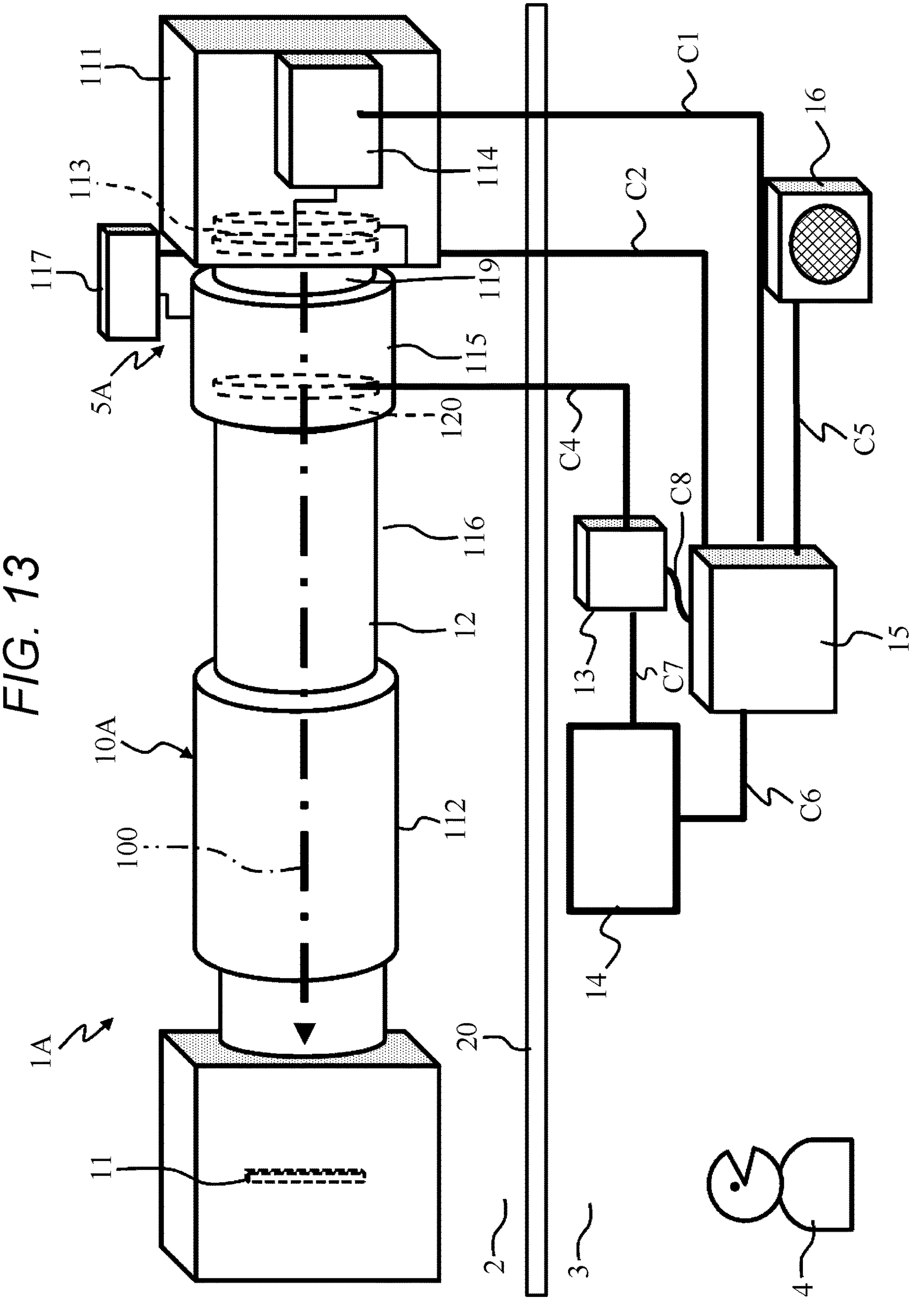
FIG. 13 is a configuration diagram of an accelerator according to a second embodiment.

A second embodiment will be described with reference to FIG. 13. In the following embodiments including the present embodiment, differences from the first embodiment will be mainly described. FIG. 13 is a configuration diagram of an accelerator 10A used in the particle therapy system 1A according to the present embodiment.

In the accelerator 10A of the present embodiment, only the solenoid electromagnet 115 is provided in the beam transport system 5A, and the downstream side solenoid electromagnet 116 shown in the first embodiment is not provided.

The present embodiment configured as described above also has substantially the same operational effects as the first embodiment. Furthermore, in the present embodiment, since only one solenoid electromagnet 115 is provided, the number of parts can be reduced and the manufacturing cost can be reduced.

Third Embodiment

Figure 14:
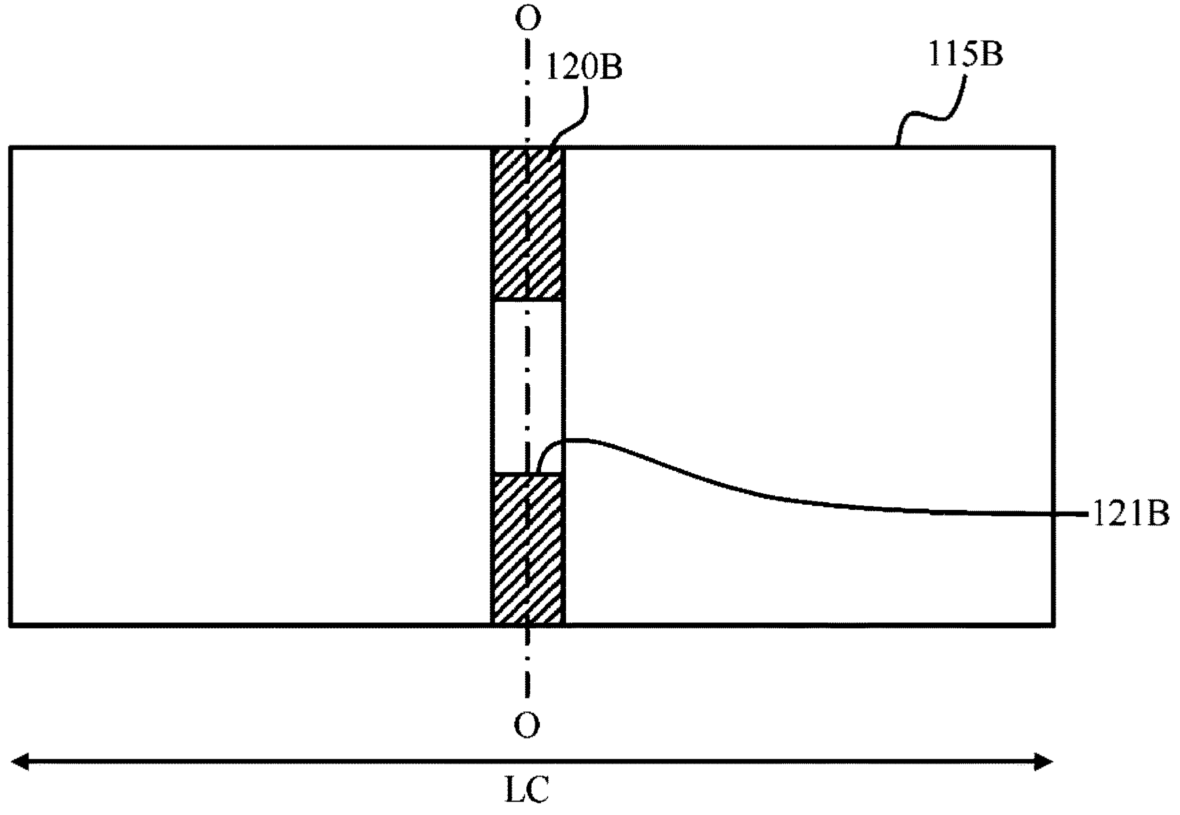
FIG. 14 is an explanatory diagram illustrating a relationship between a solenoid electromagnet and a collimator according to a third embodiment.

A third embodiment will be described with reference to FIG. 14. FIG. 14 is an explanatory diagram illustrating a relationship between a solenoid electromagnet 115B and a collimator 120B. In the present embodiment, an annular collimator 120B having an opening portion 121B is provided at substantially the center O-O of an axial length LC of the solenoid electromagnet 115B. In the present embodiment configured as described above, although there is a possibility that the function of converging the beam changes, substantially the same functions and effects as those of the first embodiment are obtained.

Fourth Embodiment

Figure 15:
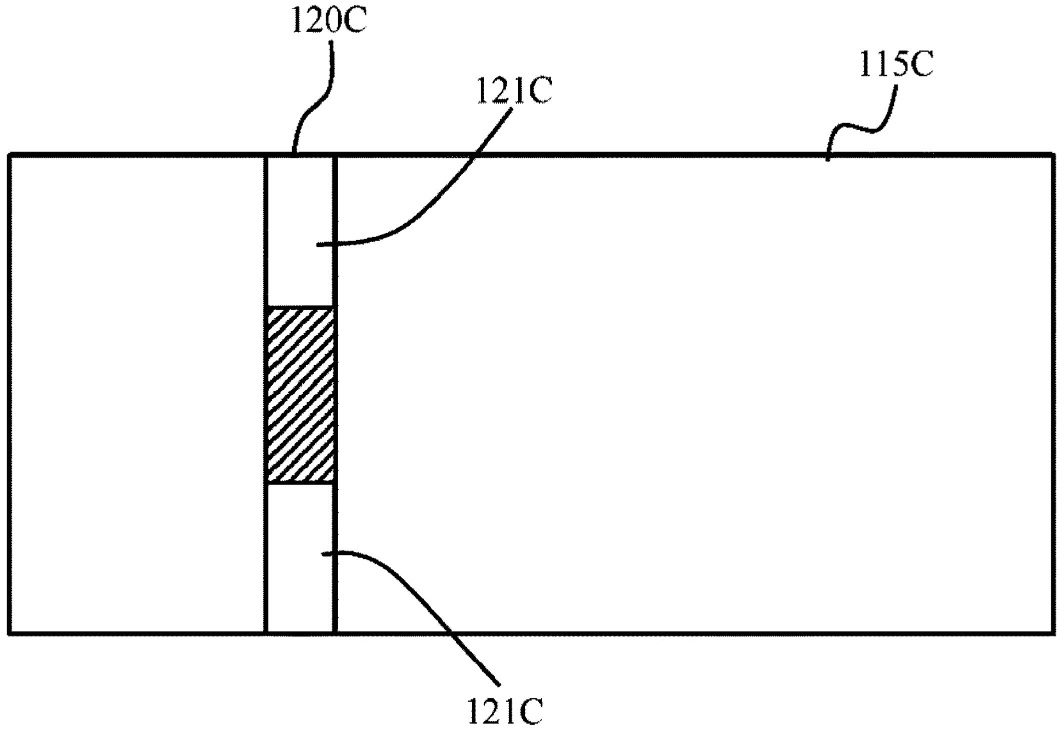
FIG. 15 is an explanatory diagram illustrating a relationship between a solenoid electromagnet and another collimator according to a fourth embodiment.
Figure 16:
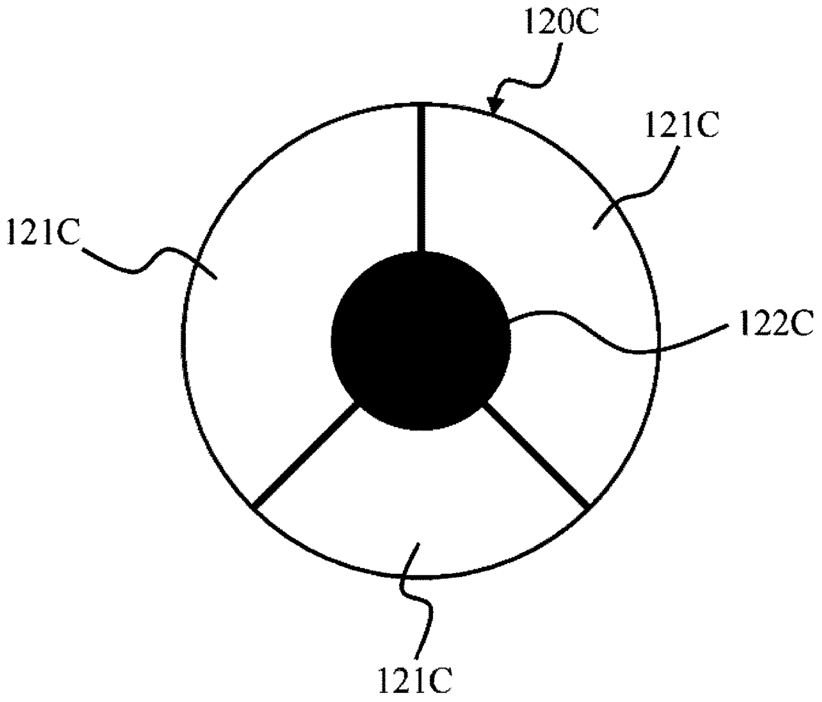
FIG. 16 is a plan view of the collimator in FIG. 15.

A fourth embodiment will be described with reference to FIGS. 15 and 16. FIG. 15 is a cross-sectional view. FIG. 16 is a plan view. In the present embodiment, a collimator 120C that stops particles in the vicinity of the center and allows only outer particles to pass is provided in a solenoid electromagnet 115C. A shielding portion 122C having a small diameter is provided at the center of the collimator 120C, and a plurality of opening portions 121C are formed at intervals in the circumferential direction outside the shielding portion 122C.

In the present embodiment configured as described above, the particle at the center in the traveling direction of the proton beam 100 can be stopped and the outer particle can pass therethrough. That is, in the present embodiment, it is possible to select particles having a large emittance and stop particles having a small emittance.

Fifth Embodiment

Figure 17:
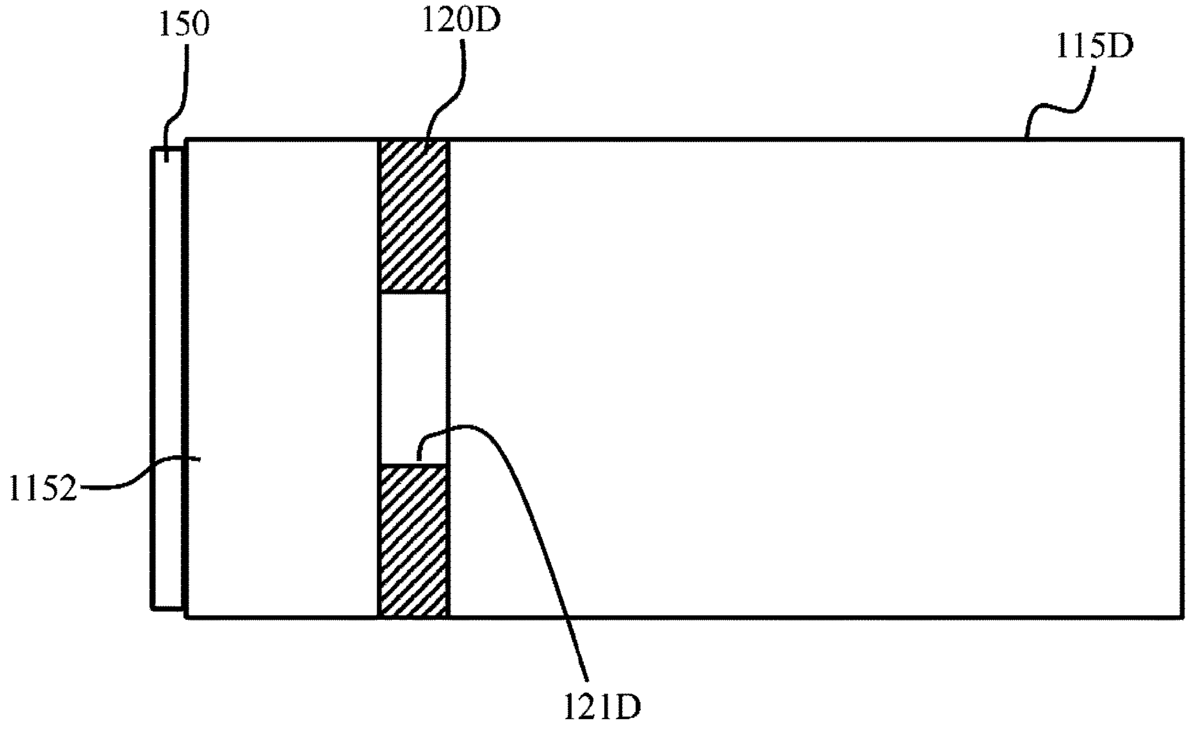
FIG. 17 is an explanatory diagram illustrating a relationship between a solenoid electromagnet, a collimator, and a beam monitor according to a fifth embodiment.

A fifth embodiment will be described with reference to FIG. 17. FIG. 17 is a cross-sectional view illustrating a relationship between a solenoid electromagnet 115D and a collimator 120D. The collimator 120D includes an opening portion 121D. In the present embodiment, a beam monitor 150 is arranged on an outlet 1152 side of the solenoid electromagnet 115D. In the present embodiment, the beam monitor 150 measures the state of the proton beam 100 passing through the solenoid electromagnet 115D.

Figure 12:
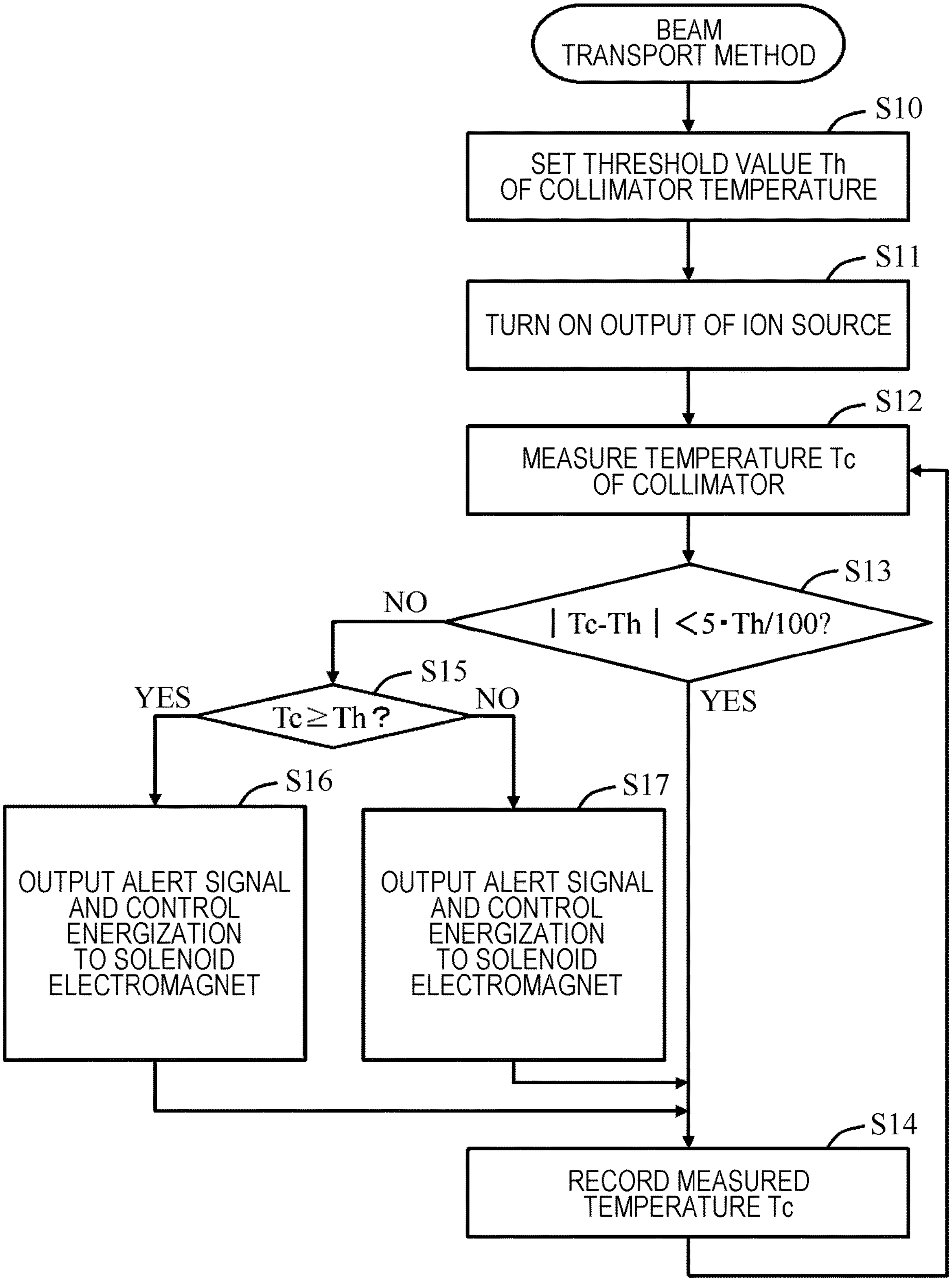
FIG. 12 is a flowchart illustrating a beam transport method.

Therefore, in the present embodiment, it is not necessary to control the energization to the solenoid electromagnet 115D based on the temperature rise value of the collimator 120D as described in FIG. 12. The control system 15 controls energization of the solenoid electromagnet 115D based on the measurement result from the beam monitor 150.

The above-described configuration, function, and operation are merely examples, and are not limited thereto. For example, in the present embodiment, the beam transport line transports the beam from the ion source for the particle therapy system to the radio frequency quadrupole linear accelerator, but the accelerator that performs the beam transport is not limited to this example. For example, an accelerator for nuclear conversion, an accelerator for nuclear fusion, or an accelerator for particle therapy may be used. The accelerator described in each embodiment is a linear accelerator, but instead of this, a circular accelerator or the like may be used.

At least one solenoid electromagnet may be provided between the ion source and the accelerator. In the embodiment, one or two solenoid electromagnets are provided, but three or more solenoid electromagnets may be disposed. Further, a collimator may be disposed in at least one of the three or more solenoid electromagnets. If necessary, a collimator can also be arranged in a plurality or all of the solenoid electromagnets of the three or more solenoid electromagnets.

The feedback destination based on the measurement result of the temperature of the collimator is not limited to the current output amount of the solenoid electromagnet power supply, and may be the ion source extraction power supply voltage.

Thus, the present invention is not limited to the above-described embodiments. Those skilled in the art can make various additions and modifications within the scope of the present invention. The configuration and the processing method of the embodiment can be appropriately changed.

In addition, each constituent element of the present invention can be arbitrarily selected, and an invention having a selected configuration is also included in the present invention. Further, the configurations described in the claims can be combined with other than the combinations specified in the claims.

What is claimed is:

1. A beam transport system for transporting a charged particle beam, the beam transport system comprising:

a magnetic field generation device that is provided in a transport line that transports the charged particle beam and generates a magnetic field parallel to a center orbit of the charged particle beam;

a beam shielding device, that is provided in a region through which the charged particle beam in the magnetic field generation device passes, is configured to cause a portion of the charged particle beam in a predetermined range of the charged particle beam to pass through, and stop another portion of the charged particle beam; and a control system configured to adjust an angular momentum of the charged particle beam to ≠0 and adjust the Twiss parameter α to be close to 0 at at-least one point on the central orbit of the charged particle beam in the beam shielding device.

2. The beam transport system according to claim 1, wherein the magnetic field generation device is a solenoid electromagnet that generates the magnetic field parallel to the center orbit of the charged particle beam, and wherein the beam shielding device is a collimator that is provided in the solenoid electromagnet and the collimator is configured to stop a charged particle deviated from the center orbit of the charged particle beam by a predetermined value or more.

3. The beam transport system according to claim 2, wherein the control system controls energization of the solenoid electromagnet.

4. The beam transport system according to claim 1, wherein the control system controls the energization of the solenoid electromagnet based on temperature of the collimator to adjust the Twiss parameter α to be near 0 at at-least one point of the center orbit of the charged particle beam in the collimator.

5. The beam transport system according to claim 4, wherein the collimator is provided in a range from an axial center in the solenoid electromagnet to an outlet from which a charged particle beam is extracted.

6. The beam transport system according to claim 1, wherein another solenoid electromagnet different from the solenoid electromagnet is provided on a downstream side of the solenoid electromagnet in a traveling direction of the charged particle beam.

7. An accelerator comprising the beam transport system according to claim 1.

8. An ion source connected to the beam transport system according to claim 1.

9. A beam transport method for transporting a charged particle beam by a beam transport system, the beam transport method comprising:

disposing a collimator in a solenoid electromagnet provided in the middle of a transport line that transports the charged particle beam, and setting an angular momentum of the charged particle beam not to be 0 and a Twiss parameter α to be near 0 at at least one point of a center orbit of the charged particle beam in the collimator.

* * * * *